United States Patent [19]
Hensel

[11] 3,956,841
[45] May 18, 1976

[54] SHOPPING CART DIRECTORY

[76] Inventor: Ann C. Hensel, 19120 Bessemer St., Reseda, Calif. 91335

[22] Filed: June 4, 1975

[21] Appl. No.: 583,521

[52] U.S. Cl. ............................ 40/308; 280/33.99 A
[51] Int. Cl.² ........................................ B62B 11/00
[58] Field of Search ................. 40/308, 128, 125 R, 40/23 R; 248/223; 280/33.99 A

[56] References Cited
UNITED STATES PATENTS

| | | | |
|---|---|---|---|
| 2,859,008 | 11/1958 | Zimmer | 248/223 |
| 3,625,464 | 12/1971 | Conran | 248/223 |
| 3,782,747 | 1/1974 | Hamilton, Jr. | 40/308 |

Primary Examiner—Louis G. Mancene
Assistant Examiner—John H. Wolff
Attorney, Agent, or Firm—Jack C. Munro

[57] ABSTRACT

A shopping cart directory comprising a flat board upon which is positioned appropriate indicia to indicate the location of different purchaseable items within a store, the plate being mounted upon a shopping cart which is movable within the store, the plate having a pair of fixed brackets mounted on the back end thereof and a pair of movable brackets mounted on the back end thereof, each of the brackets to cooperate with the wire rods of the shopping cart, the movable brackets to be forced into tight engagement with one of the rods of the shopping cart with the movable bracket canting a slight amount and biting into the back end of the plate thereby maintaining a secured position upon the shopping cart.

4 Claims, 6 Drawing Figures

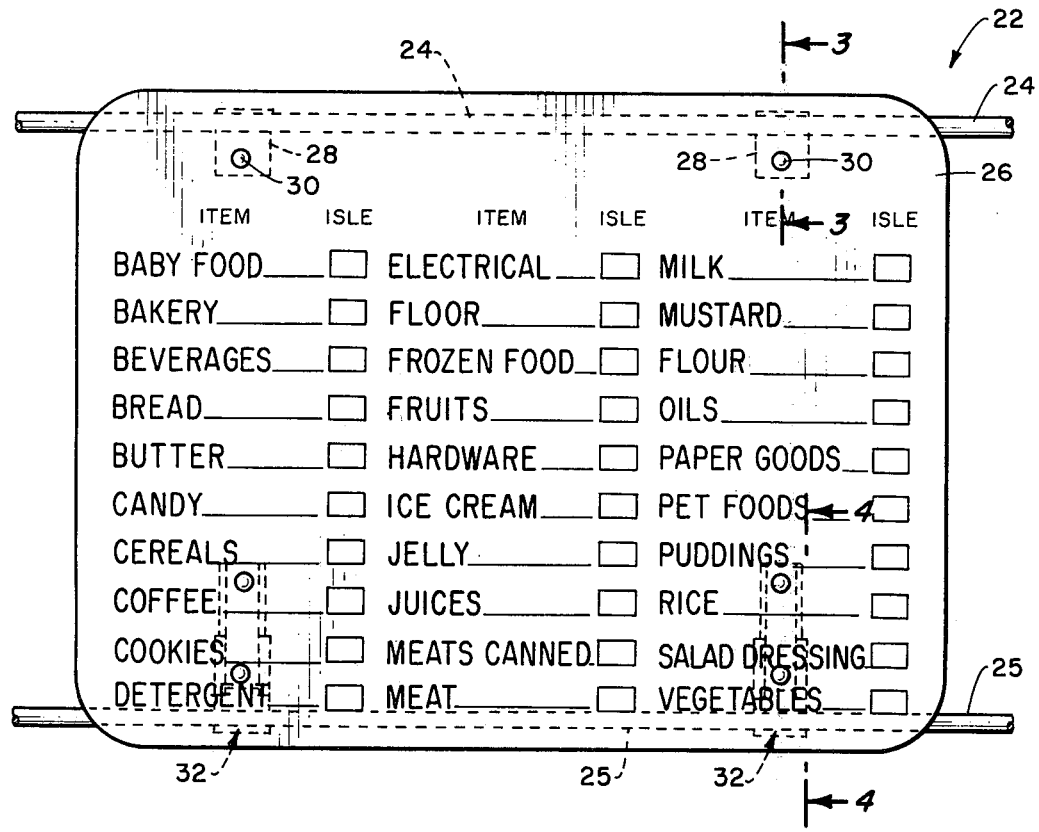

| ITEM | ISLE | ITEM | ISLE | ITEM | ISLE |
|---|---|---|---|---|---|
| BABY FOOD | ☐ | ELECTRICAL | ☐ | MILK | ☐ |
| BAKERY | ☐ | FLOOR | ☐ | MUSTARD | ☐ |
| BEVERAGES | ☐ | FROZEN FOOD | ☐ | FLOUR | ☐ |
| BREAD | ☐ | FRUITS | ☐ | OILS | ☐ |
| BUTTER | ☐ | HARDWARE | ☐ | PAPER GOODS | ☐ |
| CANDY | ☐ | ICE CREAM | ☐ | PET FOODS | ☐ |
| CEREALS | ☐ | JELLY | ☐ | PUDDINGS | ☐ |
| COFFEE | ☐ | JUICES | ☐ | RICE | ☐ |
| COOKIES | ☐ | MEATS CANNED | ☐ | SALAD DRESSING | ☐ |
| DETERGENT | ☐ | MEAT | ☐ | VEGETABLES | ☐ |

SHOPPING CART DIRECTORY

BACKGROUND OF THE INVENTION

The field of this invention relates to a directory, and more particularly the use of a directory for a shopping cart which is movable within a store having a large selection of items available for purchase.

Within a conventional food market, there are normally 10 or 15 to 20 different aisles upon which are located the different items available for purchase. It is not uncommon within a food market to have several thousand different items. Locating the placement of the different items can be a time consuming procedure, especially if you are not familiar with that particular store.

Almost everyone that enters a large size food market will take a conventional shopping cart along with him into which the items to be purchased are placed. It would be preferable if some type of directory could be located upon the shopping cart and therefore could be readily read by the person using the cart.

SUMMARY OF THE INVENTION

The structure of this invention is believed to be summarily described in The Abstract Of The Disclosure and reference is to be had thereto.

The primary advantage of the structure of this invention is the inclusion of a directory located upon the shopping cart which is used by almost every shopper which enters a large food market. The directory can be made most inexpensively and easily placed, in a secure manner, upon a conventional shopping cart. The location of the indicia on the directory can be readily changed or altered when the items are relocated within different areas of the store.

BRIEF DESCRIPTION OF THE DRAWING

FIG. 1 is a side view of a conventional shopping cart;

FIG. 2 is a view of the directory of this invention taken along line 2—2 of FIG. 1;

FIG. 3 is a cross-sectional view taken along line 3—3 of FIG. 2;

FIG. 4 is a cross-sectional view taken along line 4—4 of FIG. 2;

FIG. 5 is a view of the back end of the directory of this invention taken along line 5—5 of FIG. 4; and FIG. 6 is a cross-sectional view taken along line 6—6 of FIG. 5.

BRIEF DESCRIPTION OF THE SHOWN EMBODIMENT

Referring particularly to the drawing, there is shown in FIG. 1 a conventional shopping cart 10 which has a basket section 12, a handle section 14, and a bottom section 16 upon which are mounted the wheels 18. The basket 12 includes a separate basket section 20 located adjacent the handle section 14 and at the upper open section of the basket 12. Normally, the function of the section 20 is to facilitate placement of squashable items or a child may be placed within this portion of the basket. The directory 22 of this invention is to be mounted upon the section 20. However, it is considered to be within the scope of this invention that the directory 22 could be mounted on other sections of the basket 12, if desired.

The section 20 is formed of a plurality of spaced apart metal rods, such as rods 24 and 25 of FIG. 2 of the drawing. The directory 22 includes a flat directory plate 26 which has imprinted thereon indicia in the form of a list of a plurality of items available for purchase within the store. The items listed on the directory 26 will normally be items that are readily purchased. Also, it is to be noted that the indicia includes a plurality of indentations or separate box-like sections which are to be used to denote which aisle the item is located. The box-like sections are adapted to receive little numbers located on a paper backing which include adhesive and that can be attached to the particular box-like section denoting in which aisle the particular item is located.

Attached adjacent the upper end of the backside of the plate 26 are a pair of laterally spaced apart fixed clamping brackets 28. Each of the brackets 28 are secured by means of a rivet 30 to the plate 26. Each of the clamping brackets 28 are flared outwardly from the backside of the plate 26 and is adapted to bind between the backside of the plate 26 and the clamping bracket 28 and the rod 24. The plate 26 is to be constructed of a rigid material, such as a plastic which can also be colored to match the store decor.

Also attached to the backside of the plate 26 are a pair of movable clamping brackets 32.

Each of the lower clamping brackets 32 comprise a fixed member 34 which is attached to the plate 26 by means of a pair of rivets 36. The fixed member 34 includes a pair of side flanges 38 and 40 which are spaced a short distance from the backside of the plate 26. A member 42 is movably mounted upon the fixed member 34. The member 42 is U-shaped at each side thereof, forming a pair of legs 44 and 46. The leg 44 extends within the space provided between the flange 38 and the directory plate 26. In a similar manner, the leg 46 extends but is located within the space provided between the flange 40 and the directory plate 26.

The upper edge of the leg 44 is formed into a sharp, serrated surface 48. In a similar manner, the upper edge of the leg 46 is formed into a sharp, serrated surface 50. Located on the inside of the leg 48 is a protuberance 52. A similar such protuberance 54 is attached to the inside of the leg 46. The protuberances 52 and 54 are formed substantially midway of the length of the member 42.

Attached to the member 42 is a flared-out section 56. The flared-out section 56 is adapted to engage the rod 25, with the rod 25 being located between section 56 and the plate 26.

In order to install the directory plate 26 of this invention, the installer insures initially that the movable members 42 are positioned adjacent the upper end of the fixed member 34 as shown in the phantom line position in FIGS. 4 and 5.

The operator then places the fixed clamping brackets 28 in contact with the rod 24. The operator then positions the directory plate 26 in contact with the rod 25. At this time the installer will permit the movable members 42 to drop and with the flared-out sections 56 coming into contact with the rod 25. At this time, the installer exerts a slight force upon each of the members 42 tending to move apart rods 24 and 25. This creates a slight wedging action tending to maintain tight attachment of the directory plate 26 to the shopping cart 10.

The installer then release the movable members 42 which causes each movable member 42 to become canted and pivot slightly about the protuberances 52 and 54. The serrated surfaces 48 and 50 then dig into the back surface of the plate 26 resulting in the movable members 42 becoming fixedly positioned. This results in the directory plate 26 being secured to the section 20 of the basket 12.

It is to be understood that there will be a directory plate 26 for each individual shopping cart 10. If it is desired to remove the plate 26 from the shoppping cart, it is only necessary to reverse the installing procedure which results in the members 42 becoming disengaged from the plate 26 and permit such to be moved with respect to the fixed members 34 permitting removal of the plate 26.

What is claimed is:

1. In combination with a shopping cart, said shopping cart being movable, said shopping cart including a wire basket section formed of a plurality of spaced apart wire rods, a directory for engaging said wire rods and being fixedly mounted upon the shopping cart, said directory comprising:
   a directory plate being formed of a rigid material, said directory plate having a front surface and a back surface, said front surface having indicia thereon to facilitate location of a plurality of purchaseable items within a store;
   first clamping bracket means attached to said backside of asid directory plate, said first clamping bracket means being fixed to said plate and adapted to bind a single one of said wire rods between said back surface and said bracket means;
   second clamping bracket means attached to said back surface of said directory plate, said second clamping bracket means including a first member fixedly attached to said directory plate and a second member being movably mounted upon said first member, said second member to tightly engage by wedging against another one of said wire rods and remain in a fixed position thereby securing said directory plate to said shopping cart.

2. In combination with a shopping cart, said shopping cart being movable, said shopping cart including a wire basket section formed of a plurality of spaced apart wire rods, a directory for engaging said wire rods and being fixedly mounted upon the shopping cart, said directory comprising:
   a directory plate being formed of a rigid material, said directory plate having a front surface and a back surface, said front surface having indicia thereon to facilitate location of a plurality of purchaseable items within a store;
   first clamping bracket means attached to said backside of said directory plate, said first clamping bracket means being fixed to said plate and adapted to engage a single one of said wire rods;
   second clamping bracket means attached to said back surface of said directory plate, said second clamping bracket means including a first member fixedly attached to said directory plate and a second member being movably mounted upon said first member, said second member to tightly engage another one of said wire rods and remain in a fixed position thereby securing said directory plate to said shopping cart; and
   said second member adapted to assume a canted position with respect to said first member when said directory plate is installed upon said shopping cart, said second member including engagement means to slightly penetrate the back surface of said directory plate to thereby fix the position of said second member with respect to said directory plate.

3. The combination as defined in claim 2 wherein:
   said second member including protuberance means, said protuberance means to be in contact with said first member and permit said second member to pivot with respect to said first member to assume said canted position.

4. The combination as defined in claim 3 wherein:
   said engagement means comprising a plurality of serrations formed upon the upper most edge of said second member.

* * * * *